US012452053B2

(12) United States Patent
Tamishetty et al.

(10) Patent No.: US 12,452,053 B2
(45) Date of Patent: Oct. 21, 2025

(54) SYSTEMS AND METHODS FOR RESTORING SECURE CONNECTIONS BETWEEN DATA PROCESSING SYSTEMS AND CONTROL PLANES

(71) Applicant: Dell Products L.P., Round Rock, TX (US)

(72) Inventors: Ravinder Tamishetty, Singapore (SG); Xingyu Wang, Singapore (SG); Eric Joseph Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 18/619,680

(22) Filed: Mar. 28, 2024

(65) Prior Publication Data
US 2025/0310095 A1     Oct. 2, 2025

(51) Int. Cl.
*H04L 9/08* (2006.01)
(52) U.S. Cl.
CPC .......... *H04L 9/0877* (2013.01); *H04L 9/0897* (2013.01)
(58) Field of Classification Search
CPC .................................................. H04L 9/0877
See application file for complete search history.

(56) References Cited

U.S. PATENT DOCUMENTS

| | | | | |
|---|---|---|---|---|
| 7,840,763 | B2* | 11/2010 | Murotake | G06F 12/1416 726/17 |
| 9,680,805 | B1* | 6/2017 | Rodgers | G06F 16/84 |
| 10,706,179 | B2* | 7/2020 | Kepa | H04L 9/0866 |
| 10,911,238 | B2* | 2/2021 | Voicu | H04L 63/083 |
| 11,228,421 | B1* | 1/2022 | Mesh | G06F 21/36 |
| 11,809,170 | B2* | 11/2023 | Finster | H04L 9/0825 |
| 12,032,977 | B2* | 7/2024 | Rodriguez | G06F 9/4401 |
| 12,355,873 | B1* | 7/2025 | Chase | H04L 9/0825 |
| 2022/0029790 | A1* | 1/2022 | Peddada | H04L 9/0891 |
| 2024/0137209 | A1* | 4/2024 | Veluthakkal | H04L 9/0866 |
| 2024/0356741 | A1* | 10/2024 | Amer | H04L 63/18 |
| 2025/0094601 | A1* | 3/2025 | Kar | G06F 21/57 |
| 2025/0158816 | A1* | 5/2025 | Wasily | H04L 9/0894 |

* cited by examiner

*Primary Examiner* — Viral S Lakhia
(74) *Attorney, Agent, or Firm* — WOMBLE BOND DICKINSON (US) LLP

(57) ABSTRACT

Methods and systems for managing operation of a data processing system are disclosed. To manage operation of the data processing system, new secrets may be established for use in operation of the data processing system when a trusted platform module of the data processing system is replaced. To establish the new secrets, the data processing system may use a recovery secret stored in a partition in storage to establish a recovery connection between the data processing system and a control plane. The recovery connection may be used by the data processing system to establish new secrets and securely store the secrets in a replacement trusted platform module for future use.

20 Claims, 9 Drawing Sheets

SYSTEMS AND METHODS FOR RESTORING SECURE CONNECTIONS BETWEEN DATA PROCESSING SYSTEMS AND CONTROL PLANES

FIELD

Embodiments disclosed herein relate generally to managing data processing systems. More particularly, embodiments disclosed herein relate to systems and methods to manage connections between data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
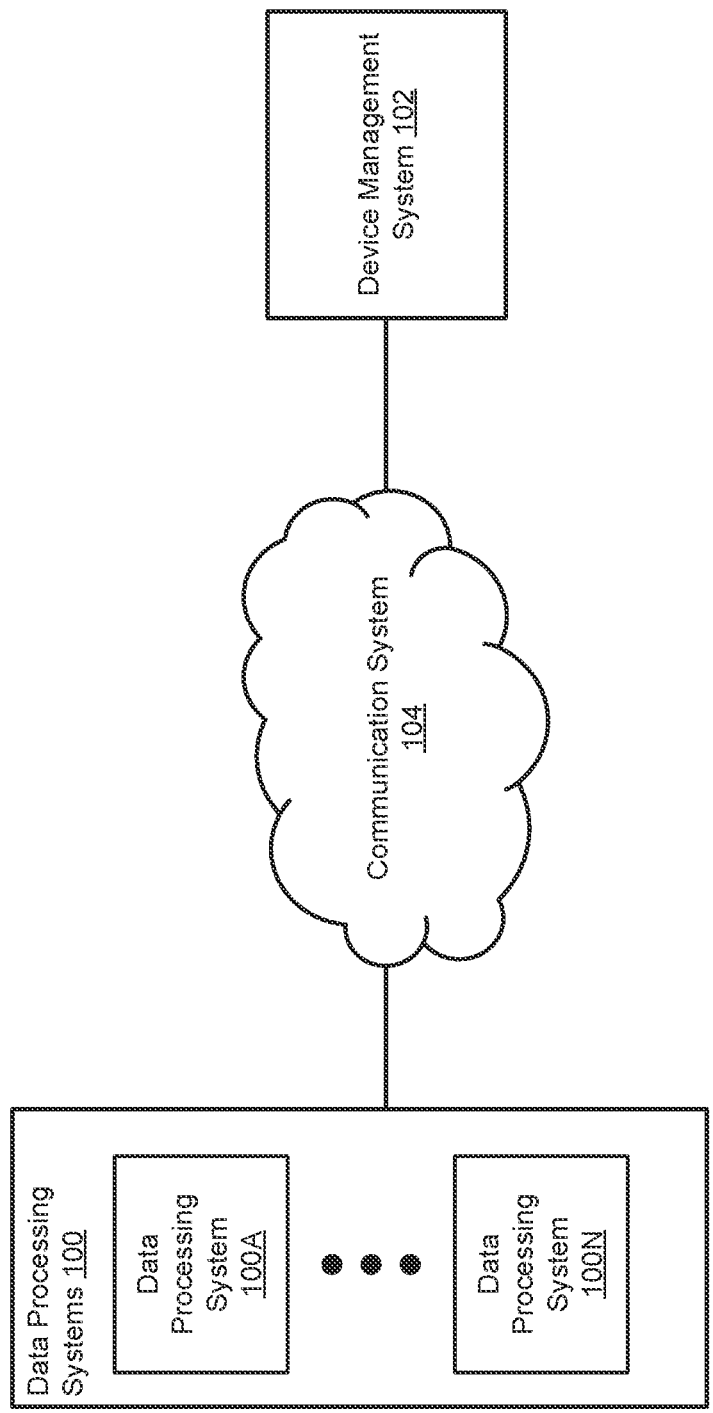
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operations of data processing systems. The data processing systems may provide computer-implemented services to any type and number of other devices and/or users of the data processing systems. The computer-implemented services may include any quantity and type of such services.

To provide computer-implemented services, data processing systems may include hardware components (e.g., processors, storage drives, memory, etc.) and software components of the hardware components. The data processing systems may utilize specific hardware components to store secrets (e.g., encryption keys, certificates, etc.) associated with the data processing system. For example, the secrets may be securely stored in a trusted platform module (TPM) hosted by a motherboard of the data processing system. The secrets may be used, by the data processing system, to perform cryptographic processes, for example, to encrypt data and transmit the encrypted data to an external device. For example, the data processing system may generate a signature to sign a message (e.g., data structure including a payload) using a private key of a public private key pair maintained by the TPM of the data processing system in order to improve the security of the data being transmitted to external devices.

Overtime, some hardware components of the data processing system may fail and/or may need to be replaced. Secrets that may be stored by the hardware component may be lost after failure and/or replacement of the hardware component. Therefore, the functionality of the data processing system may be impacted and/or limited if the secrets stored by the hardware component are lost. For example, if the motherboard is replaced, the secrets (e.g., stored by the TPM hosted by the motherboard) used for improving the security of the data processing system become unavailable.

To establish new secrets after replacement of a motherboard, the data processing system may include a recovery secret stored in a recovery partition of the data processing system in order to establish a secure communication channel with the control plane associated with the data processing system. The recovery secret may include an encryption key established and accessible by both the data processing system and the control plane. For example, the recovery secret may include a symmetric key generated by either the data processing system and/or the control plane and securely stored by both systems in order to re-establish the trustworthiness of the data processing system in the event of a To re-establish the secure communication channel, the data processing system may provide, at least a data structure derived from the recovery secret, to the control plane and the control plane may verify the signature of the data structure using the recovery secret maintained by the control plane. By doing so, the data processing system (e.g., the replaced hardware component) may be trusted by the control plane and the secure communication channel between the data processing system and the control plane may be re-established.

Once the secure communication channel is established, the data processing system may generate new secrets usable to perform cryptographic processes and improve the security of the data processing system. In addition, the data processing system may generate a new recovery secret (e.g., via cooperation with the control plane) to utilize in the event of another motherboard failure and/or replacement. Therefore, the security functionalities of the data processing system may be re-established and a recovery process for the data processing system may be established.

In an embodiment, a method of managing operations of a data processing system is provided. The method may include: identifying, that a secret management component of the data processing system has been replaced; based on the secret management component having been replaced: obtaining a recovery secret from a recovery partition of the data processing system; attempting to establish a recovery connection between the data processing system and a device management system using the recovery secret; in a first instance of the attempting where the recovery connection is established using the recovery secret: initiating generation of a new normal secret; initiating generation of a new recovery secret; storing the new normal secret in a replacement secret management component; replacing the recovery secret in the recovery partition with the new recovery secret; initiating establishment of a new normal connection using the new normal secret in the replacement secret management component; and terminating the recovery connection so that only the new normal connection is available for communication between the data processing system and the device management system.

The secret management component may be a trusted platform module (TPM) hosted by a motherboard of the data processing system.

The secret management component that was replaced previously stored, before being replaced, a normal secret used to securely communicate with the device management system.

The recovery secret may be partially trusted by the device management system and the device management system requires at least one additional indication of trustworthiness for the recovery secret to be fully trusted by the device management system.

The recovery partition may be a logical allocation of storage resources of a physical data storage device that may be distinct from the secret management component, and the recovery partition may be reserved for exclusive use by an agent of the data processing system that manages recovery of connections with the device management system after failures of secret management components.

Attempting to establish the recovery connection may include: sending, by the agent, a data package to the device management system comprising an identifier of the replacement secret management component and/or a replaced motherboard of the data processing system; refusing, by the device management system and prior to being notified that the secret management component has been replaced, to establish the recovery connection; and participating, by the device management system and after being notified that the secret management component has been replaced, in establishment of the recovery connection.

The method may also include: while refusing to establish the recovery connection: obtaining, by the device management system and from a trusted system, a notification indicating that the secret management component has been replaced.

The trusted system may be a data processing system used by a person that was tasked with replacing the secret management component.

Refusing to establish the recovery connection may include: comparing, by the device management system, at least one of the identifier of the replacement secret management component and/or the identifier of the replaced motherboard to a known set of trusted identifiers of hardware components; in a first instance of the comparing where the at least one of the identifier of the replacement secret management component and/or the identifier of the replaced motherboard is not any of the known set of trusted identifiers of hardware components: concluding that the data processing system is untrustworthy; and in a second instance of the comparing where the at least one of the identifier of the replacement secret management component and/or the identifier of the replaced motherboard is one of the known set of trusted identifiers of hardware components: concluding that the data processing system is trustworthy based on being notified that the secret management component has been replaced.

Initiating generation of the new normal secret may include: providing, by an agent of the data processing system, a potential normal secret to the device management system; signing, by the device management system, the potential secret to obtain the new normal secret; and obtaining, by the data processing system and from the device management system, the new normal secret.

The new normal secret may be generated by the data processing system and provided to the device management system for validation.

Once the new normal secret may be stored in the secret management component, the secret management component may screen access to the new normal secret and may facilitate selective use of the new normal secret while a security posture of the data processing system meets security requirements.

The method may also include: prior to identifying that the secret management component of the data processing system has been replaced: establishing a normal connection using a normal secret that is managed by the secret management component prior to replacement and that allows a secure communication channel between the data processing system and the device management system to be instantiated, the normal secret being separately stored in the secret management component; and using the normal connection to establish the recovery secret to store in the recovery partition.

The data processing system may be restricted from communicating with other devices other than the device management system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide for management of operations of data processing systems that may provide, at least in part, computer-implemented services. The computer-implemented services may include any type and quantity of computer-implemented services. The computer-implemented services may include, for example, database services, data processing services, electronic communication services, and/or any other services that may be provided using one or more computer devices. The computer-implemented services may be provided by, for example, data processing systems 100, device management system 102 and/or any other type of devices (not shown in FIG. 1). Other types of computer-implemented services may be provided by the system shown in FIG. 1 without departing from embodiments disclosed herein.

The system may include any number of data processing systems 100 (e.g., computing devices) that may each include any number of hardware components (e.g., processors, memory modules, storage devices, communication devices). The hardware components may support execution of any number and types of applications (e.g., software components). Changes in available functionalities of the hardware and/or software components may provide for various types of different computer-implemented services to be provided over time.

Operation of and/or computer-implemented services provided by a data processing system (e.g., data processing system 100A) may be impacted (e.g., restricted and/or limited) based on the security posture of the data processing system. For example, data processing system 100A may include an interconnect board (e.g., circuit board connecting all the hardware components of the data processing system) that hosts a trusted platform module (TPM) (e.g., computer chip or microcontroller) tasked with securely storing secrets (e.g., cryptographic keys) usable to authenticate the hardware components of the data processing system.

For example, the TPM of data processing system 100A may determine the security posture (or security state) of data processing system 100A and therefore, restrict use of secrets which the TPM maintains on behalf of data processing system 100 until the security posture is validated to be in good standing. For example, if the TPM identifies any modifications to the hardware components and/or software components of data processing system 100A based on a security database (e.g., database including identifying information corresponding to trusted and/or verified hardware components) or other type of data structure (e.g., an image registry for software components, a key registry of trusted keys, etc.), then the TPM may determine the security posture of the data processing system to be out of compliance with requirements for use of the secrets and therefore, refuse to allow any of the secrets (e.g., securely stored by the TPM) to be used for purposes specified by the operating system of the data processing system, other entities, etc. Consequently, the restriction on the ability of other entities to invoke use of the secrets may prevent performance of certain operations by the data processing system and/or restricting performance of a variety of cryptographic processes. However, so long as the TPM determines that the host data processing system is compliant with requirements for use of the maintained secrets, then the TPM may use the secrets on behalf and/or at the direction of other entities (e.g., the TPM may sign data structures presented to it by the operating system with keys that the TPM maintains and restricts access to).

Over time, hardware components of data processing systems 100 may need to be replaced (e.g., due to various failures, accidental impacts, etc.). Continuing the example described above, the interconnect board of data processing system 100A may experience a failure (e.g., due to overheating, accidental damage, etc.) and as such, may be replaced and therefore, replacing the TPM hosted by the interconnect board (e.g., losing use of the secrets stored within the TPM). For example, prior to providing data to an external device, the data may be encrypted by using, for example, a transport layer security (TLS) key (e.g., maintained by the TPM). Replacing the interconnect board and the hosted TPM may result in loss of use of the TLS key used to encrypt the data previously. Consequently, replacement of the TPM with a new TPM may prevent use of previously established and secured communication channels.

In general, embodiments disclosed herein may provide methods, systems, and/or device for managing operations of a data processing system. To manage operations of a data processing system, a system in accordance with an embodiment may establish new secrets for use in operation of the data processing system when a TPM of the data processing system is replaced. To facilitate establishment of the new secrets, the data processing system may utilize a recovery secret stored in a partition in storage to establish a recovery connection between the data processing system and a control plane. The recovery connection may be utilized by the data processing system to establish new secrets, and securely store the secrets in a replacement TPM of the data processing system for future use.

By doing so, embodiments disclosed herein may facilitate continued provision of desired computer implemented services by data processing systems. By replacing the lost secrets, the newly established secrets may allow the data processing systems to, for example, (i) create/verify cryptographically secure data structures, (ii) establish roots of trust and/or authority verification mechanism, and/or provide for other operations that may be required for computer implemented services to be provided.

To provide the above noted functionality, the system of FIG. 1 may include data processing systems 100, device management system 102, and communication system 104. Each of these components is discussed below.

Data processing systems 100 may provide desired computer implemented services and perform cooperative processes with device management system 102 to establish new secrets when the TPM (and/or other types of secret managers) of data processing systems 100 are replaced (and/or the secrets hosted by a TPM are lost for other reasons, such as errors, storage corruption, etc.). When providing the computer implemented services, any of data processing systems (e.g., 100A-100N) may rely on the TPM to facilitate use of secrets stored by the TPM. If the TPM is unable to provide use of the secrets, then the computer implemented services may not be provided, may be provided in an impaired manner, etc.

Any of data processing systems 100 may be an edge device or other types of computing device. To reduce threats to such devices, data processing systems 100 may be configured to limit network connectivity. For example, data processing systems 100 may utilize whitelists, blacklists, and/or other communication screening mechanisms to limit communication with other devices. Such communications maybe limited to a limited number of entities that may include management entities such as device management system 102. Consequently, when a TPM is replaced, it may be more challenging to establish secure communications with other devices because data processing systems 100 may be limited in their ability to communicate (e.g., may not communicate with other entities, may have port limits, may require secure channels for communications to be allowed, etc.).

To establish new secrets, any of data processing systems 100 may perform secret establishment workflows. During the secret establishment workloads, data processing systems 100 may (i) utilize pre-positioned recovery secrets in storage (e.g., stored in a secure partition or other portion of storage) to establish new secure communications with device management system 102, (ii) cooperatively establish new secrets to be used by the data processing systems, (iii) install the newly established secrets in corresponding TPMs of the data processing systems, (iv) establish new recovery secrets for future secret establishment workflows, and/or may include other operations. By doing so, data processing systems 100 may facilitate establishment of new secrets even while subject to communication limitations.

Device management system 102 may, in addition to other services, may provide for cooperative establishment of secrets with data processing systems 100. To do so, device management system 102 may (i) utilize pre-established recovery secrets (e.g., with data processing systems) to determine trustworthiness of data processing systems, (ii) utilize input (e.g., received via notifications from an external entity) that indicates whether the replacement interconnect board and/or TPM is to be trusted, (iii) based on the input indicating data processing systems to be trusted, cooperatively establish new secure communications with data processing systems 100, (iv) cooperatively establish new recovery secrets for future secret establishment workflows, and/or may include other operations. By doing so, device management system 102 may facilitate establishment of new secure communications and new recovery secrets with data processing systems 100.

Figure 2A:
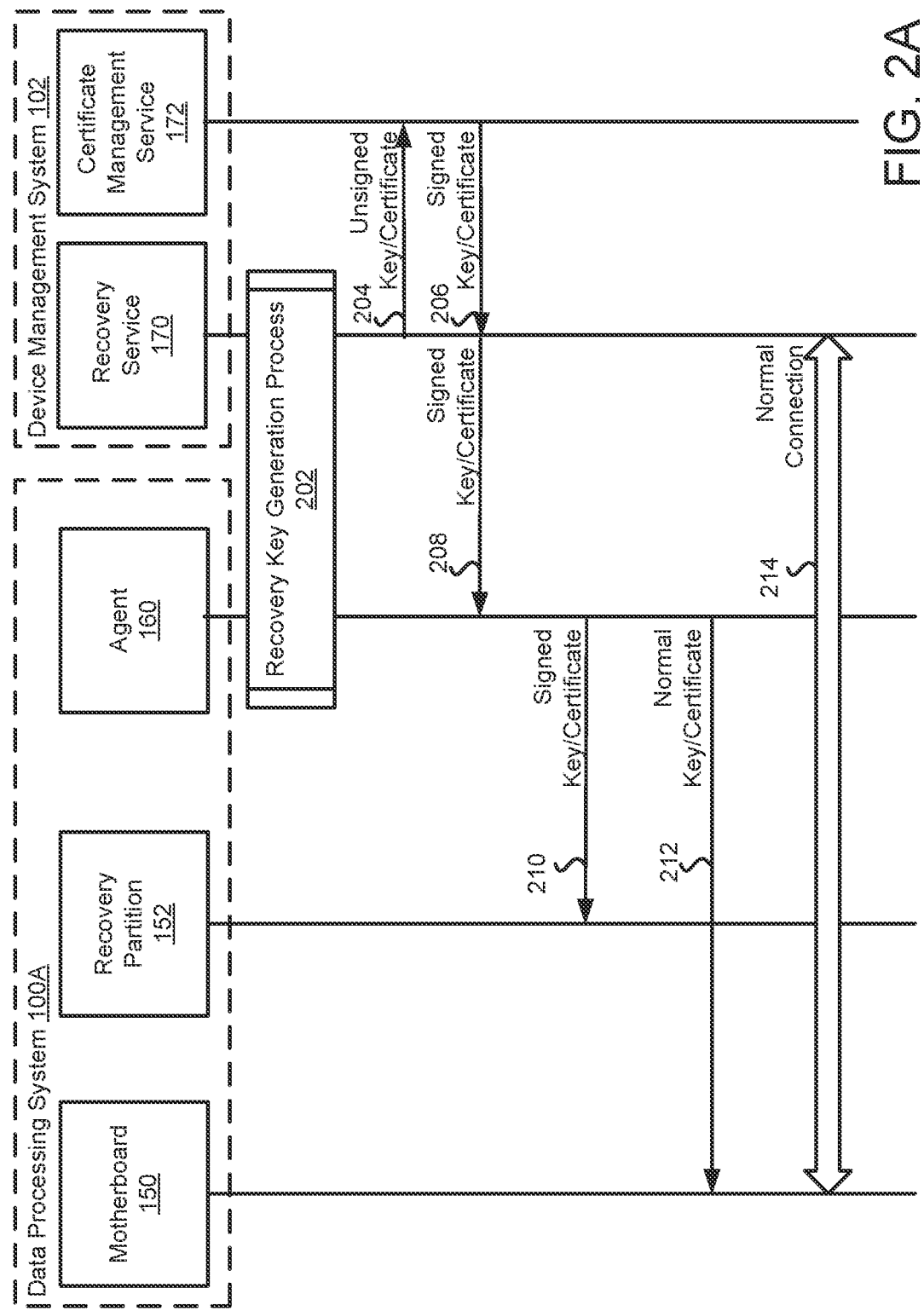
FIGS. 2A-2C show interaction diagrams in accordance with an embodiment.
Figure 2B:
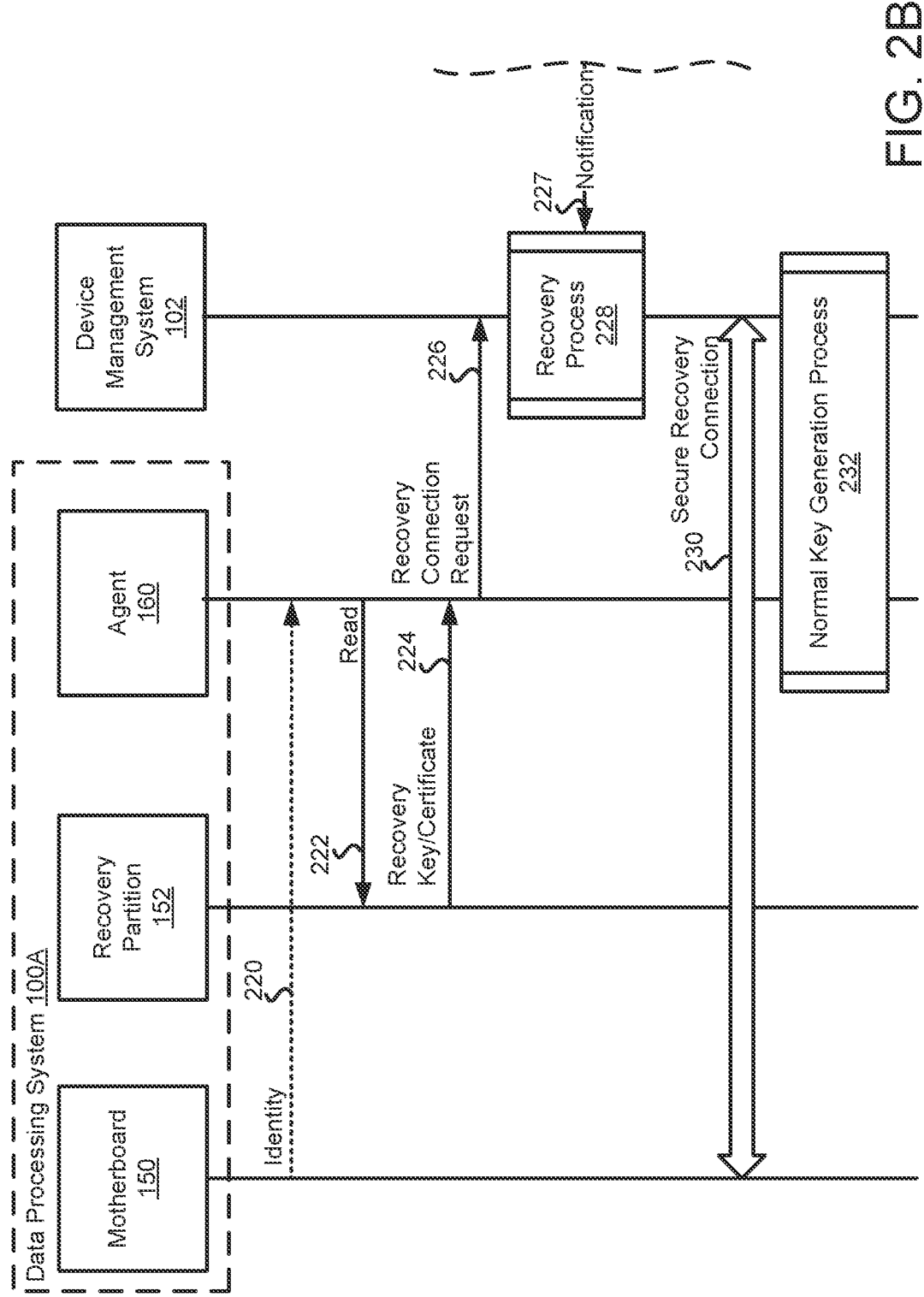
Figure 2C:
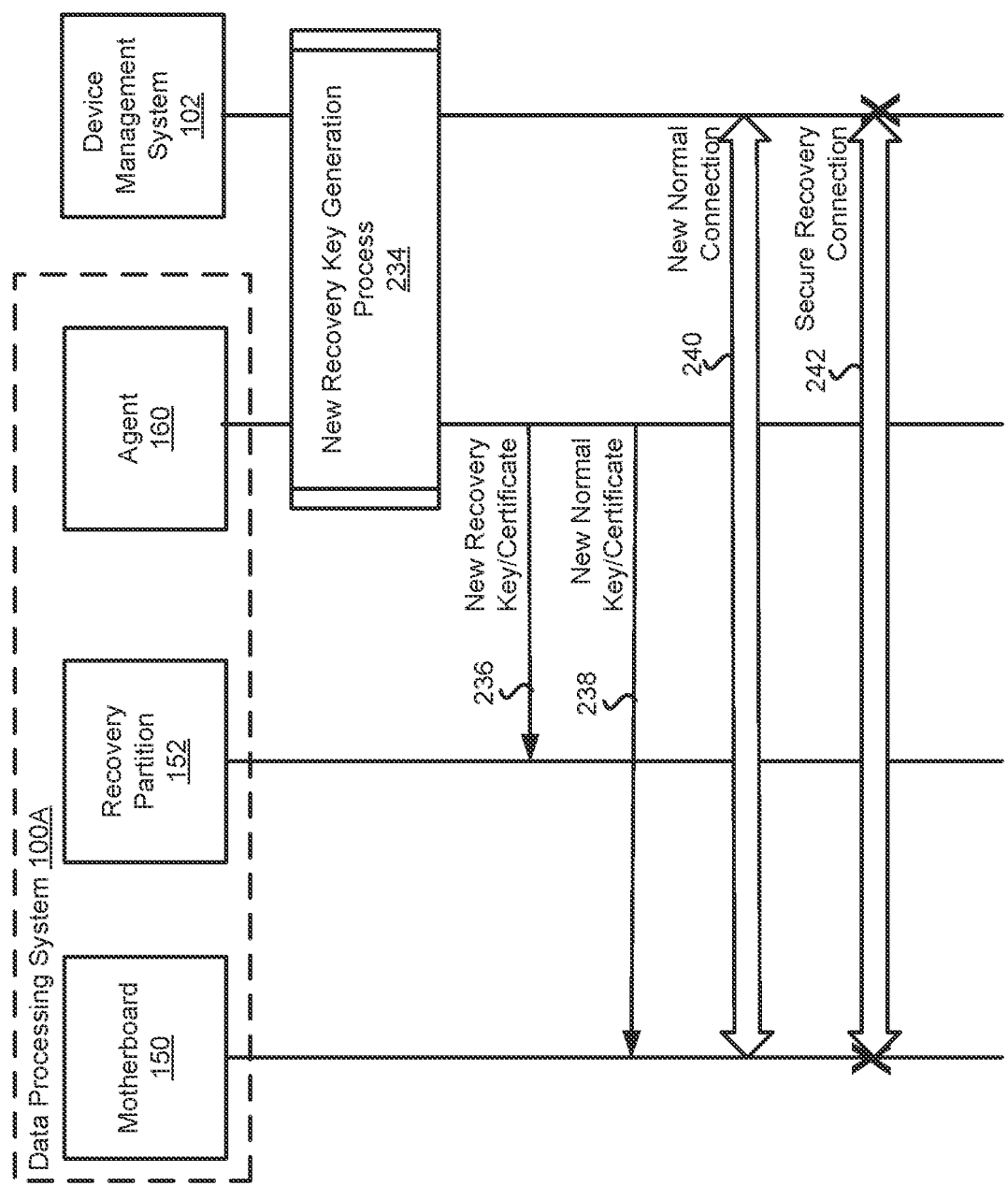

Refer to FIGS. 2A-2C for additional details regarding establishing new secure communication channels and generating new credentials, keys, and other cryptographic data for data processing systems.

When providing their functionality, any of data processing systems 100 and device management system 102 may perform all, or a portion, of the processes, interactions, and methods illustrated in FIGS. 2A-3D.

Any of data processing systems 100, and device management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 104.

Communication system 104 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 104 may be implemented with one or more local communications links (e.g., a bus interconnecting a processor of any of data processing systems 100 and device management system 102).

While illustrated in FIG. 1 as including a limited number of specific components, a system in accordance with an embodiment may include fewer, additional, and/or different components than those illustrated therein.

To further clarify embodiments disclosed herein, interactions diagrams in accordance with an embodiment are shown in FIGS. 2A-2C. These interactions diagrams may illustrate how data may be obtained and used within the system of FIG. 1

In the interaction diagrams, processes performed by and interactions between components of a system in accordance with an embodiment are shown. In the diagrams, components of the system are illustrated using a first set of shapes (e.g., motherboard 150, recovery service 170, etc.), located towards the top of each figure. Lines descend from these shapes. Processes performed by the components of the system are illustrated using a second set of shapes (e.g., recovery key generation process 202, etc.) superimposed over these lines. Interactions (e.g., communication, data transmissions, etc.) between the components of the system are illustrated using a third set of shapes (e.g., 204, 208, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 206 may occur prior to the interaction labeled as 208. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during preparation for future inaccessibility of secret management entities such as TPMs.

To prepare for future inaccessibility of secret management entities, recovery key generation process 202 may be performed. During recovery key generation process 202, agent 160 and recovery service 170 hosted by device management system 102 may cooperatively generate a mutually agreeable recovery key and/or certificate (e.g., shared recovery secret) for use by data processing system 100A and device management system 102. To generate the recovery key and/or certificate, agent 160 and recovery service 170 may exchange information (e.g., cryptographic information) usable to establish the shared recovery secret (e.g., session key, symmetric key, etc.). For example, agent 160 may generate an unsigned key/certificate (e.g., secret symmetric key) and provide the unsigned key/certificate to recovery service 170 (e.g., via a certificate signing request) for consideration of agreement to the unsigned key/certificate by device management system 102 for future use.

Following recovery key generation process 202, and at interaction 204, the unsigned key/certificate may be provided to certificate management service 172 by recovery service 170. For example, the unsigned key/certificate may be provided to certificate management service 172 via (i) transmission via a message, (ii) storing in a storage with subsequent retrieval by certificate management service 172, (iii) via a publish-subscribe system where certificate management service 172 subscribes to updates from recovery service 170 thereby causing a copy of the unsigned key/certificate to be propagated to certificate management service 172, and/or via other processes. By providing the unsigned key/certificate to certificate management service 172, certificate management service 172 may, after obtaining the unsigned key/certificate, verify and sign the unsigned key/certificate via one or more subsequently performed processes (not shown).

For example, during the one or more subsequently performed processes, the unsigned key/certificate may be used to generate a signed key/certificate (e.g., an encrypted key and/or certificate). To do so, certificate management service 172 may sign, using a private key of a public private key pair, the unsigned key/certificate to obtain a cryptographically verifiable data structure (e.g., the signed key/certificate).

At interaction 206, the signed key/certificate may be provided to recovery service 170 by certificate management service 172. For example, the signed key/certificate may be generated and provided to recovery service 170 via (i) transmission via a message, (ii) storing in a storage with subsequent retrieval by recovery service 170, (iii) via a publish-subscribe system where recovery service 170 certificate management service 172 subscribes to updates from certificate management service 172 thereby causing a copy of the signed key/certificate to be propagated to recovery service 170, and/or via other processes. By providing the signed key/certificate to recovery service 170, recovery service 170 may provide the signed key/certificate to agent 160.

At interaction 208, the signed key/certificate may be provided to agent 160 by recovery service 170. For example, the signed key/certificate may be generated and provided to agent 160 via (i) transmission via a message, (ii) storing in a storage with subsequent retrieval by agent 160, (iii) via a publish-subscribe system where agent 160 subscribes to updates from recovery service 170 thereby causing a copy of the signed key/certificate to be propagated to agent 160, and/or via other processes. By providing the signed key/certificate to agent 160, agent 160 may have a copy of the signed key/certificate, and after obtaining the signed key/certificate, agent 160 may manage the signed key/certificate for data processing system 100A via storing in recovery partition 152.

Recovery partition 152 may include, a logical delineation of storage resources of a storage device (not shown) hosted by data processing system 100A. For example, if the storage device of data processing system 100A has 100 gigabytes, a portion of the storage resources (for example, 10 gigabytes) may be allocated by recovery partition 152. Recovery partition 152 may also include access restrictions so that other programs may not access data stored in recovery partition 152 without authorization. For example, the recovery partition may be encrypted and may require a password, key, or other data for decryption for access.

At interaction 210, recovery key/certificate may be stored by agent 160 in recovery partition 152. For example, the recovery key/certificate may be generated and stored in recovery partition 152 via issuing a storage request (or other request) to an operating system (or other management entity) of data processing system 100A that manages storage of data. By storing the recovery key/certificate in recovery partition 152, the signed key/certificate may be available future use in situations when a TPM of data processing system 100A is unable to provide use of secrets.

In addition to preparing and storing the signed key/certificate, agent 160 may also participate in generation of a normal key/certificate for use by data processing system 100A in order to perform cryptographic processes with device management system 102. The normal key/certificate may be used to secure transmissions of data between device management system 102 and data processing system 100A. The normal key/certificate may be generated via any process (e.g., may be cooperative with device management system 102).

Once the normal key/certificate is obtained, at interaction 212, the normal key/certificate may be stored by agent 160 in a TPM of motherboard 150. For example, the normal key/certificate may be stored by (i) transmission via a message, (ii) a secret installation process, and/or via other processes. By storing the normal key/certificate in the TPM of motherboard 150, the TPM may be in position to assist in securing communications with device management system 102 (e.g., via encryption/decryption).

At interaction 214, a normal connection may be established between data processing system 100A (e.g., via motherboard 150) and device management system 102 (e.g., via recovery service 170). The normal connection may include a secure communication channel by which encrypted data may be transmitted between data processing system 100A and device management system 102. The secure communication channel may rely on data processing system 100A having access to the normal key/certificate stored in the TPM of motherboard 150.

Thus, as shown in the example of FIG. 2A, a data processing system may obtain mutually trusted secrets (e.g., both normal and recovery key/certificates) with a device management service and establish a secure communication channel through which the encrypted data may be transmitted between the data processing system and the device management service.

Following establishment of the secrets as discussed with respect to FIG. 2B, a TPM and/or host motherboard of data processing system 100A may need to be replaced. As noted above, this replacement may deprive data processing systems 100A of use of the secrets stored therein. Consequently, data processing system 100A may be deprived of use of normal connection 214.

Turning to FIG. 2B, a second interaction diagram in accordance with an embodiment is shown. The second interaction diagram may illustrate example processes and interactions that may occur during a secret establishment workflow which may be performed after secrets previously relied upon such as the normal key/certificate described with respect to FIG. 2A become unusable.

To perform the secret establishment workflow, at interaction 220, identity information for data processing system 100A may be provided to agent 160. The identity information may be provided via (i) transmission via a message, (ii) storing in a storage with subsequent retrieval by agent 160, (iii) via a publish-subscribe system where agent 160 subscribes to updates from motherboard 150 thereby causing a copy of the identity to be propagated to agent 160, and/or via other processes.

For example, after motherboard 150 is replaced, data processing system 100A may be powered back on and a startup may be performed. During the startup, the hardware of data processing system 100A may be inventoried by a startup management entity. The startup management entity may identify that motherboard 150 has been replaced, and automatically notify agent 160 of the replacement via any information exchange system.

By providing the identity to agent 160, agent 160 may identify the new hardware component (e.g., in a scenario where motherboard 150 and/or the hosted TPM are replaced) and initiate a recovery process to establish a secure recovery communication channel with device management system 102 through which new secrets may be established.

Once the identity is obtained, at interaction 222, a read request may be initiated by agent 160 for the recovery key/certificate stored in the partition of recovery partition 152. While shown as going from agent 160 to recovery partition 152, it will be appreciated that the read may be initially transmitted to a management entity such as an operating system which may in turn send various commands to storage media in which the partition in which the recovery key/certificate is stored. These storage commands may include, for example, block reads that enable the recovery key/certificate to be obtained.

The recovery key/certificate may be that described with respect to FIG. 2A.

Once the read is issued, at interaction 224, recovery key/certificate may be provided to agent 160. For example, the read may cause the storage media to retrieve the recovery key/certificate and in turn a copy may be provided to agent 160.

Once obtained, agent 160 may, at interaction 226, use the recovery key/certificate to send a recovery connection request to device management system 102. The recovery connection request may include: (i) a payload indicating a hardware component (e.g., motherboard 150) hosted by the data processing system has been replaced, (ii) the identity of the data processing system, (iii) a signature generated using the recovery key/certificate and/or a copy of the recovery key/certificate, and/or other data. Once generated, the recovery connection request may be sent to device management system 102 via a predetermined manner (e.g., such as via a particular port, via a particular communication protocol, etc. and that complies with the communication restrictions enforced by data processing system 100A).

In response to receiving the recovery connect request, device management system 102 may perform recovery process 228. During recovery process 228, device management system 102 may cooperatively establish secure recovery connection 230. However, device management system 102 may not participate until at least one additional factor to authenticate the authenticity of the recovery connection request is obtained. For example, device management system 102 may refuse to participate until another device (e.g., a trusted device) signals to device management system 102. The signal may indicate that some other entity (e.g., a technician tasked with replacing the TPM/host motherboard of data processing system 100A) has caused data processing system 100A to lose access to the secrets required for use of normal connection 214.

For example, at interaction 227 a technician may use a personal computing device to input information indicating replacement of motherboard 150. The information may be relayed to a server or other device that is trusted by device management system 102. Consequently, when the notification from the server or other device is obtained by device management system 102, the notification may serve as a second factor of authentication (e.g., in addition to signatures included in the recovery connection request).

Once both (or any number required) of factors of authentication are verified, device management system 102 may, as part of recovery process 228, utilize the recovery key/certificate maintained by device management system 102 to verify that the recovery connection request was signed using the recovery key/certificate established between device management system 102 and data processing system 100A (e.g., recovery generation process 202 described in FIG. 2A). By doing so, device management system 102 may verify the integrity and trust in the contents of the recovery connect request.

If the recovery connection request and other factors of authentication are verified, device management system 102 may, as part of recovery process 228, extract a payload from the recovery connection request and perform additional verification of the hardware components of data processing system 100A. For example, the payload may include identifiers for the hardware components of data processing system 100A (e.g., unique identifiers, serial numbers, etc.) usable to verify the identity of the hardware components. Device management system 102 may perform a comparison process using the identifiers for the hardware components (e.g., received via the payload) and the identifiers of the trusted hardware components (e.g., established via a trusted device) to determine whether the hardware components of data processing system 100A are trustworthy. If the identity of the hardware components indicated in the payload match the identity of the trusted hardware components (e.g., stored in a database of device management system 102), device management system 102 may honor the request to establish a recovery connection (e.g., secure recovery connection 230) between data processing system 100A and device management system 102.

If the request to establish the recovery connection is to be honored, device management system 102 may cooperatively establish a secure recovery communication channel (e.g., secure recovery connection 230) between motherboard 150 (e.g., hosted by data processing system 100A).

The secure recovery connection, at interaction 230, may be established in order to securely transmit data between data processing system 100A and device management system 102. The secure recovery connection may include, for example, using a secret symmetric key established by data processing system 100A and device management system 102.

Once established, device management system 102 and data processing system 100A may utilize the secure recovery connection to perform normal key generation process 232 establish new cryptographic keys (including a new normal key). During normal key generation process 232, agent 160 and device management system 102 may cooperatively generate a mutually agreeable new normal key/certificate which may be utilized for transmission of encrypted data between the devices. For example, agent 160 may generate a new symmetric key and initiate a certificate signing request (e.g., to be executed by device management system 102) in order to obtain a mutually agreeable symmetric key (e.g., new normal key/certificate). Agent 160 may provide the certificate signing request to device management system 102 using the secure recovery connection. The certificate signing request may include (i) a request to sign (e.g., using a private key of a public private key pair) the data structure, (ii) the new symmetric key (e.g., generated by agent 160), and/or (iii) any other information necessary to perform certificate signature services.

Upon receiving the certificate signing request, device management system 102 may accept or deny the request for certificate signatures. If device management system 102 denies the certificate signing request, device management system 102 may provide a notification to agent 160 indicating that the request is denied, one or more suggested actions to troubleshoot the denied certificate signing request (e.g., additional information regarding an acceptable symmetric key), and request for generation of a new symmetric key. If device management system 102 accepts the certificate signing request, device management system 102 may (i) sign the data structure (e.g., including the new normal key generated by agent 160) using a private key of a public private key pair maintained by device management system 102, and (ii) provide the signed data structure to agent 160 via the secure recovery connection.

Turning to FIG. 2C, a third interaction diagram in accordance with an embodiment is shown. The third interaction diagram may illustrate processes and interactions that may occur during generation of new recovery secrets and establishment of normal connection communication channel between a data processing system and device management system.

The "x" appearing on the lines descending from some of the first set of shapes (e.g., motherboard 150, device management system 102) are drawn to indicate, for example, that the corresponding connection may be severed between the corresponding components. Specifically, motherboard 150 and device management system 102 may not utilize the secure recovery connection (e.g., illustrated by interaction 242) to transmit data (e.g., after a new normal connection is established, the secure recovery connection may be terminated, keys supporting the secure recovery connection may be voided/untrusted, etc.).

Following the new normal key generation process 232 described in FIG. 2B, agent 160 and device management system 102 may be responsible for generating a new recovery key for data processing system 100A (and/or otherwise placing data processing system 100A in condition to establish new secure recovery connections, which may not be possible using the previously utilized secrets stored in recovery partition 152). The new recovery key may include, for example, a transport layer security (TLS) key usable to authenticate a new secure recovery communication channel between data processing system 100A and device management system 102 that may be established in the event of a failure and/or loss of normal keys/certificates (e.g., secrets stored by the TPM).

To initiate generation of the recovery key/certificate, agent 160 and device management system 102 may perform new recovery key generation process 234. During new recovery key generation process 234, agent 160 and/or device management system 102 may generate a recovery key/certificate that is agreeable by both components (e.g., agent 160 and device management system 102) in order to perform verification of trust process(es) at a point in time in the future.

During new recovery key generation process 234, new recovery keys may be established by (i) generating a recovery key/certificate, (ii) providing the recovery key/certificate to the other component for approval, (iii) based on the approval of the recovery key/certificate, providing the recovery key/certificate to recovery partition 152, and/or (iv) performing other actions relating to obtaining a recovery key/certificate. In other words, similar methods and processes performed during recover key generation process 202 described in FIG. 2A may be performed during new recovery key generation process 234. Refer to FIG. 2A for additional details regarding generating a new recovery key for a data processing system.

Once obtained, the new recovery key/certificate may be stored in recovery partition 152 of data processing system 100A, at interaction 236. The new recovery key/certificate may be stored in recovery partition 152 via the operating system (e.g., agent 160 may request that the new recovery key be stored in recovery partition 152, and the operating system, drivers, etc. may do so based on the request).

To prepare to transition from the secure recovery connection to a normal connection, at interaction 238, the new normal key/certificate may be stored in a TPM or another secret manager. To do so, for example, the new normal key/certificate may be provided to motherboard 150 by agent 160.

Once the new normal key/certificate is with the TPM, at interaction 240, a new normal connection between motherboard 150 and device management system 102 may be established in order to transmit data in a secure manner (e.g., via cryptographic processes) between data processing system 100A and device management system 102. The new normal connection may be established and maintained using the new normal key/certificate. For example, the new normal key/certificate may be used as a cypher and/or may be used to establish cryptographic data (e.g., session keys) to cypher data carried by the new normal connection.

Once the new normal connection is established, at interaction 242, the secure recovery connection between data processing system 100A and device management system 102 may be terminated (e.g., disconnected) as indicated by the "x" shown on the descending lines from the corresponding components. The cryptographic data used to support operation of the secure recovery connection may be marked or otherwise treated as being invalid for use in the future thereby leaving only the new recovery key/certificate as usable to establish new secure recovery connections in the future.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via processes and interactions shown in FIGS. 2A-2C, communication capabilities between devices may be reestablished after use of secrets previously used to facilitate the communication capabilities is no longer available even in limited communication environments such as edge systems that may rely on limited communication capabilities for security purposes.

As discussed above, the components of FIGS. 1-2C may perform various methods to manage the operation of data processing systems. FIGS. 3A-3D illustrates methods that may be performed by the components of FIGS. 1-2C. In the diagrams discussed below and shown in FIGS. 3A-3D, any of the operations may be repeated, performed in different orders, and/or performed in parallel with or in a partially overlapping in time manner with other operations.

Figure 3A:
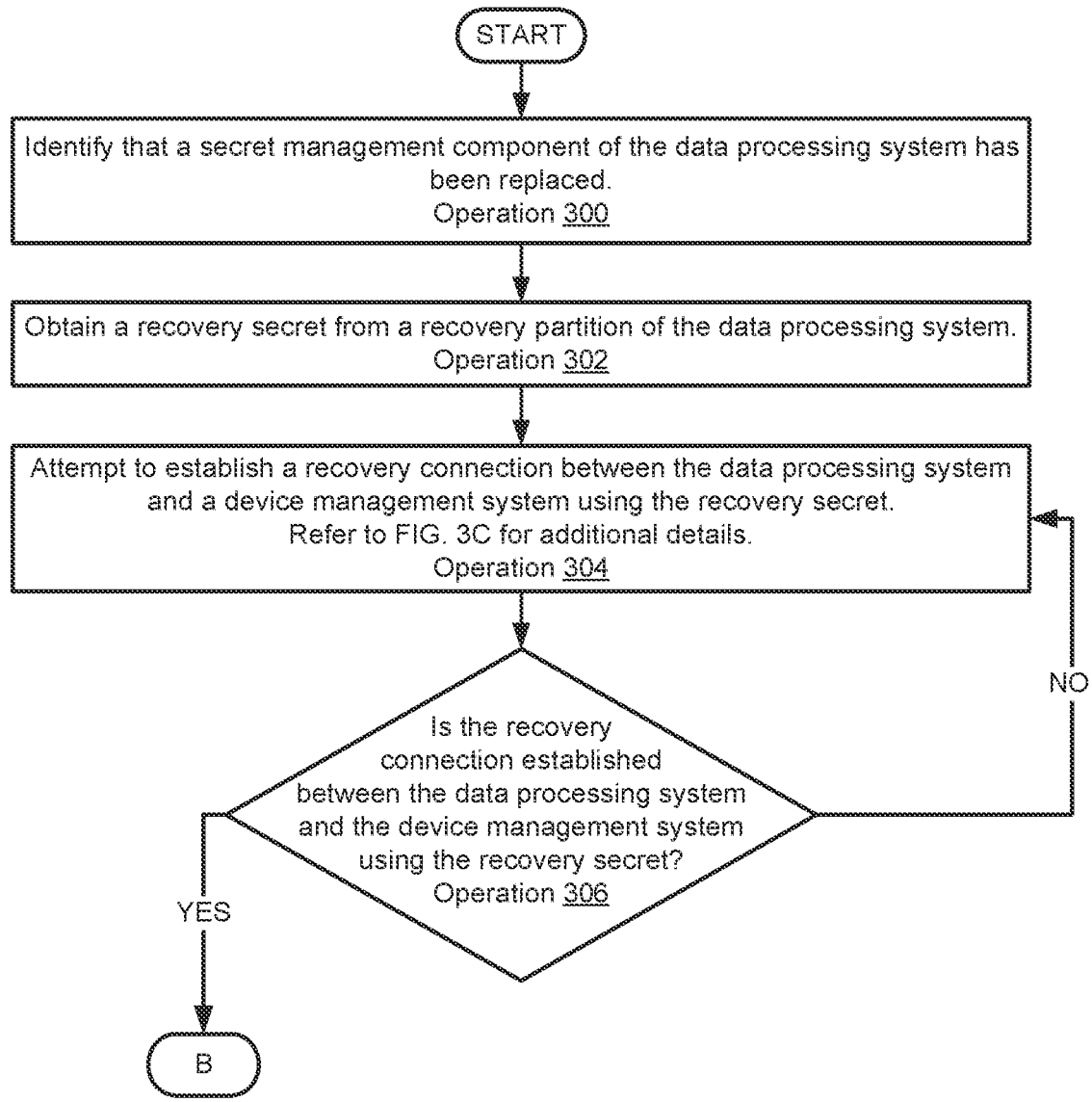
FIGS. 3A-3D show flow diagrams illustrating methods in accordance with an embodiment.

Turning to FIG. 3A, a first flow diagram illustrating a method of managing operations of a data processing system in accordance with an embodiment is shown. The method may be performed by any of data processing systems 100, device management system 102, and/or other entities without departing from embodiments disclosed herein.

Prior to operation 300, the data processing system (and/or component of the data processing system) may (i) establish a normal connection using a normal secret (e.g., managed by the secret management component) that allows a secure communication channel between the data processing system and a device management system and (ii) establish a recovery secret (e.g., symmetric key or certificate) between the data processing system and device management system to use in the event of failure and/or replacement of the secret management system. Refer to FIG. 3D for additional details regarding establishing a normal connection and recovery secret for the data processing system.

At operation 300, a replacement of a secret management component of the data processing system may be identified. The replacement of the secret management component may be identified by (i) performing a startup process of the data processing system and attempting to access a normal secret by an agent of the data processing system, (ii) receiving a notification, by the agent from the operating system of the data processing system, that the normal secret (e.g., stored by the secret management component) is inaccessible (e.g., the normal secret cannot be obtained due to loss of the normal secret), and/or (iii) via other methods.

At operation 302, a recovery secret from a recovery partition of the data processing system may be obtained. The recovery secret may be obtained by (i) requesting, by the agent, access to the recovery secret stored in the recovery partition, (ii) providing, by the recovery partition, the recovery secret to the agent, and/or (iii) any other methods.

At operation 304, establishment of a recovery connection between the data processing system and a device management system may be attempted using the recovery secret. The attempt may be made by (i) using the recovery secret to sign a network data unit (e.g., a packet in an internet protocol communication network) and/or data structure (e.g., announcement package, message, etc.), (ii) providing the signed data unit and/or data structure to the device management system, and/or via other methods. The attempt may be repeated until successful, and/or until a condition occurs (e.g., a timeout or other limiter). As discussed above, the device management system may refuse such attempts until at least one additional factor indicating that the attempt is legitimate is received. The factor may be, for example, a technician or other person that replaced the secret management components sending a notification to the device management system of the replacement. Refer to FIG. 3C for additional details regarding attempting to establish a recovery connection between a data processing system and a device management system.

At operation 306, a determination may be made regarding whether the recovery connection between the data processing system and the device management system is established. The determination may be made by (i) attempting, by the agent of the data processing system, to communicate with the device management system, (ii) obtaining a response from the device management system and/or other indicator of acceptance of a request to establish the recovery connection), and/or (iii) performing other methods.

Figure 3B:
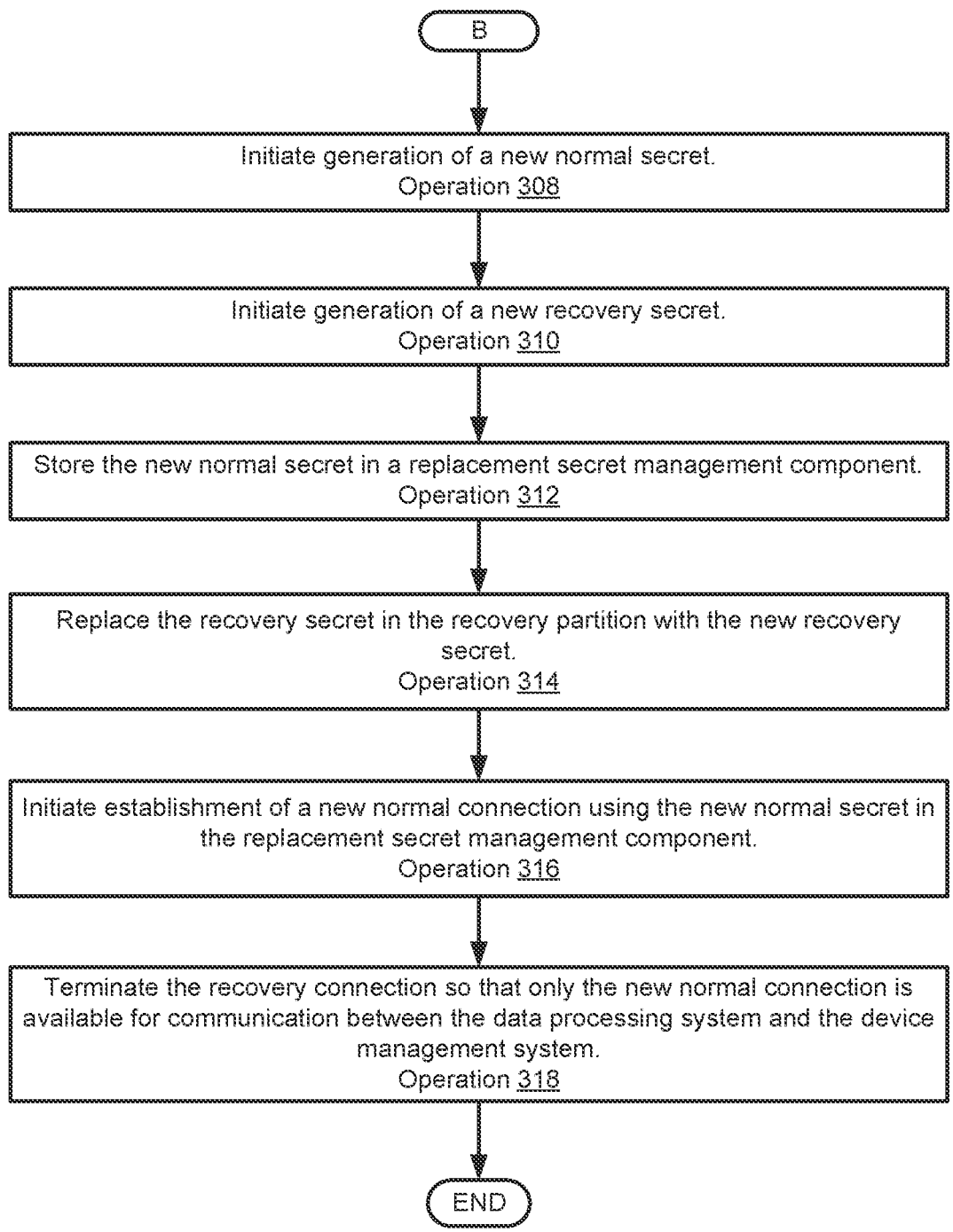
Figure 3C:
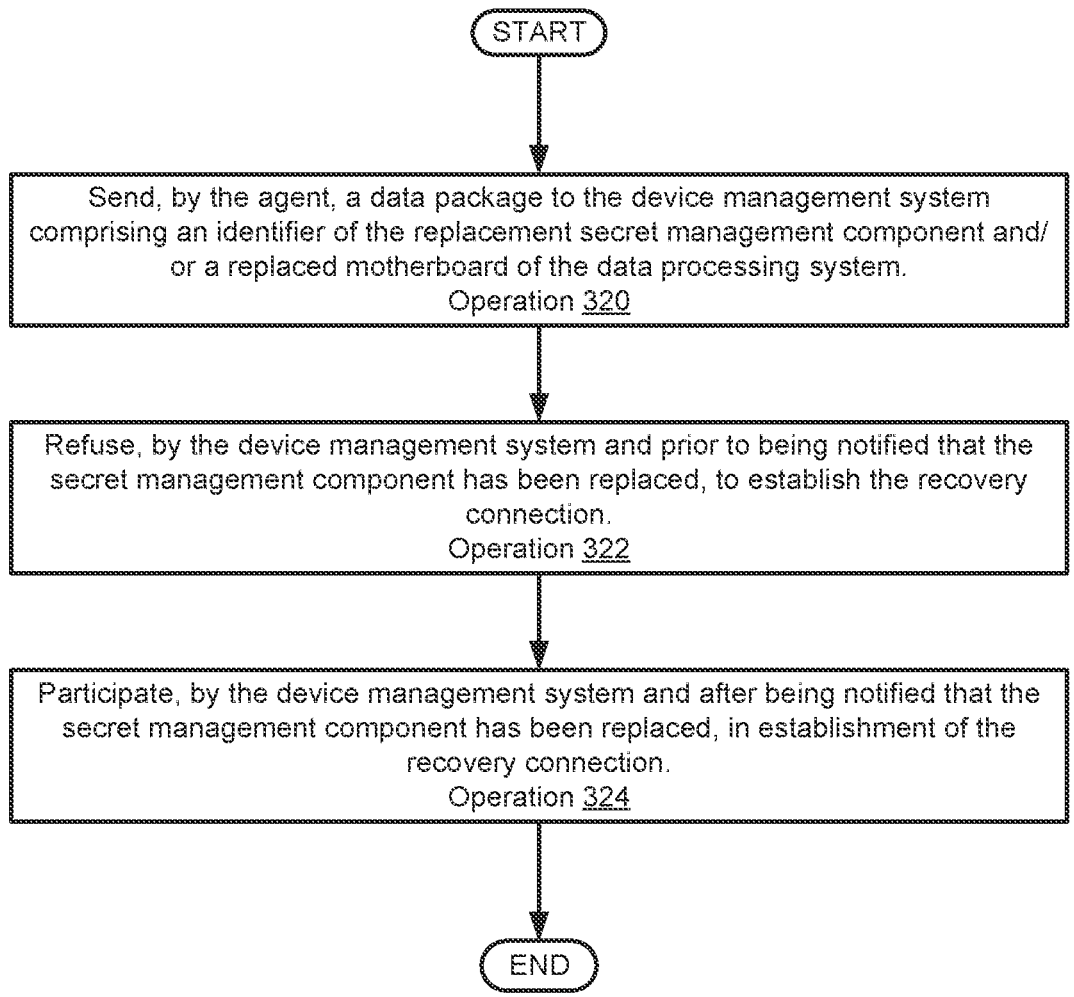
Figure 3D:
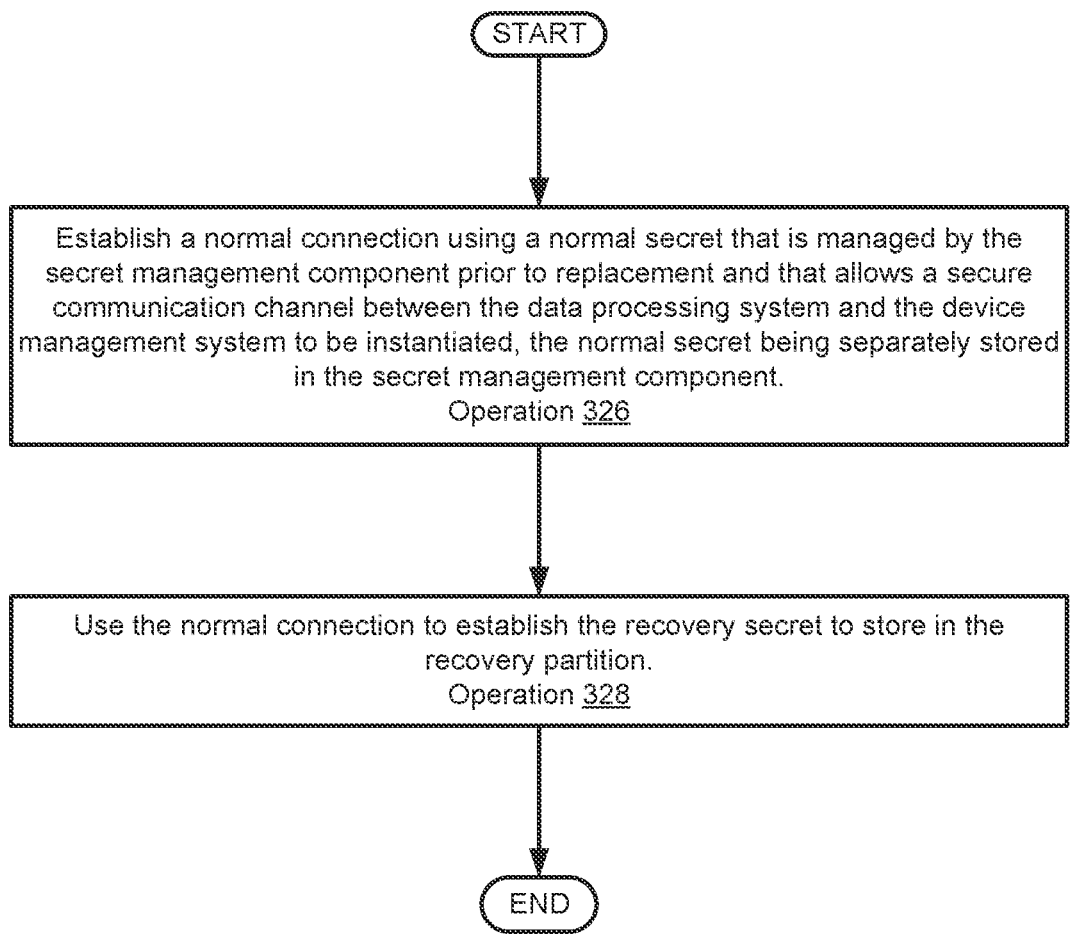

If the recovery connection between the data processing system and the device management system is established (e.g., the determination is "Yes" at operation 306), then the method may proceed to operation 308 as discussed in FIG. 3B.

Returning to operation 306, if the recovery connection between the data processing system and the device management system is not established (e.g., the determination is "No" at operation 306), then the method may return to operation 304.

Turning to FIG. 3B, a second flow diagram illustrating a method of managing operations of a data processing system in accordance with an embodiment is shown. The method may be performed by any of data processing systems 100, device management system 102, and/or other entities without departing from embodiments disclosed herein.

Continuing the description of FIG. 3A, at operation 308, generation of a new normal secret may be initiated. The generation of the new normal secret may be initiated by (i) providing, by an agent of the data processing system, a potential normal secret to the device management system, (ii) signing, by the device management system, the potential secret to obtain the new normal secret, (iii) obtaining, by the data processing system and from the device management system, the new normal secret, and/or (iv) other methods.

At operation 310, generation of a new recovery secret may be initiated. Generation of the new recovery secret may be initiated by (i) providing, by the agent of the data processing system, a potential recovery secret to the device management system, (ii) signing, by the device management system, the potential recovery secret to obtain the new recovery secret, (iii) obtaining, by the data processing system and from the device management system, the new recovery secret, and/or (iv) other methods.

At operation 312, the new normal secret may be stored in a replacement secret management component. The new normal secret may be stored by (i) obtaining the new normal secret, by the replacement secret management component, (ii) storing the new normal secret in the replacement secret management component, and/or (iii) other methods.

At operation 314, the recovery secret in the recovery partition may be replaced with the new recovery secret. The recovery secret may be replaced by (i) obtaining, by the agent of the data processing system, the new recovery secret, (ii) providing the new recovery secret to the recovery partition to store (e.g., via an operating system, driver, etc.), (iii) removing the recovery secret from storage in the recovery partition and/or otherwise indicating that the recovery secret is not to be used in the future, and/or (iv) other methods.

At operation 316, establishment of a new normal connection using the new normal secret in the replacement secret management component may be initiated. The establishment of the new normal connection may be initiated by (i) generating and signing a data structure using the new normal secret, (ii) providing the signed data structure to the device management system, and/or (iii) other methods.

At operation 318, the recovery connection may be terminated so that only the new normal connection may be available for communication between the data processing system and the device management system. The recovery connection may be terminated by (i) removing the recovery secret stored in the recovery partition, (ii) storing the new recovery key in the recovery partition, and/or (iii) other methods.

Turning to FIG. 3C, a third flow diagram illustrating a method of managing operations of a data processing system in accordance with an embodiment is shown. The method may be performed to establish a recovery connection between the data processing system and a device management system.

At operation 320, a data package may be sent to the device management system. The data package may include an identifier of the replacement secret management component and/or a replaced motherboard of the data processing system. The data package may be sent to the device management system by (i) generating the data package by the agent, (ii) signing the data package using the recovery secret, (iii) providing the data package (including the signature) to the device management system, and/or (iv) other methods.

At operation 322, establishing the recovery connection may be refused by the device management system. Refusing to establish the recovery connection may be based on not receiving a notification indicating that the secret management component has been replaced. The notification may be obtained by the device management system via (i) reading it from storage, (ii) receiving it via electronic communication from a trusted device, and/or (iii) any other methods. For example, a technician (e.g., tasked with replacing the secret management component) may use a trusted device (e.g., personal computer) to input information indicating the replacement of the secret management component and provide the notification to the device management system via a server or other device (e.g., trusted by the device management system).

In addition, refusing to establish the recovery connection may include (i) comparing, by the device management system, at least one of the identifier of the replacement secret management component and/or the identifier of the replaced motherboard to a known set of trusted identifiers of hardware components, (ii) making a conclusion whether the data processing system is trustworthy, and/or (iii) other methods.

In a first instance of the comparing where the at least one of the identifier of the replacement secret management component and/or identifier of the replaced motherboard is not any of the known set of the trusted identifiers of hardware components: concluding that the data processing system is untrustworthy.

In a second instance of the comparing where the at least one of the identifier of the replacement secret management component and/or the identifier of the replaced motherboard is one of the known set of trusted identifiers of hardware components: concluding that the data processing system is trustworthy based on being notified that the secret management component has been replaced.

At operation 324, establishment of the recovery connection may be participated by the device management system after being notified that the secret management component has been replaced. After obtaining the notification indicating that the secret management component has been replaced, the device management system may participate in establishment of the recovery connection by (i) updating the known set of trusted identifiers of hardware components with the identifier of the replacement secret management component, and/or (ii) generating a secure communication channel with the replacement secret management component.

Turning to FIG. 3D, a fourth flow diagram illustrating a method of managing operations of a data processing system in accordance with an embodiment is shown. The method may be performed to establish a normal connection and a recovery secret between the data processing system and a device management system.

Prior to identifying that the secret management component of the data processing system has been replaced, at operation 300, the data processing system may perform the methods described below (e.g., operations 326-328) in order to establish a normal connection and cooperatively generate an agreed recovery secret with the device management system.

At operation 326, a normal connection may be established. The normal connection may be established using a normal secret that is managed by the secret management component prior to replacement and that allows a secure communication channel between the data processing system and the device management system to be instantiated. The normal secret may be separately stored in the secret management component. The normal connection may be established by (i) generating a normal secret by the secret management component, (ii) using the normal secret to establish a normal connection with the device management system, and/or (iii) other methods.

At operation 328, the normal connection may be used to establish the recovery secret to store in the recovery partition. The normal connection may be used to establish the recovery secret by (i) generating, by the agent of the data processing system, the recovery secret, (ii) providing, via the normal connection, the recovery secret to the device management system for agreement, (iii) receiving, via the normal connection, the signed recovery secret by the data processing system from the device management system, and/or (iv) other methods.

Figure 4:
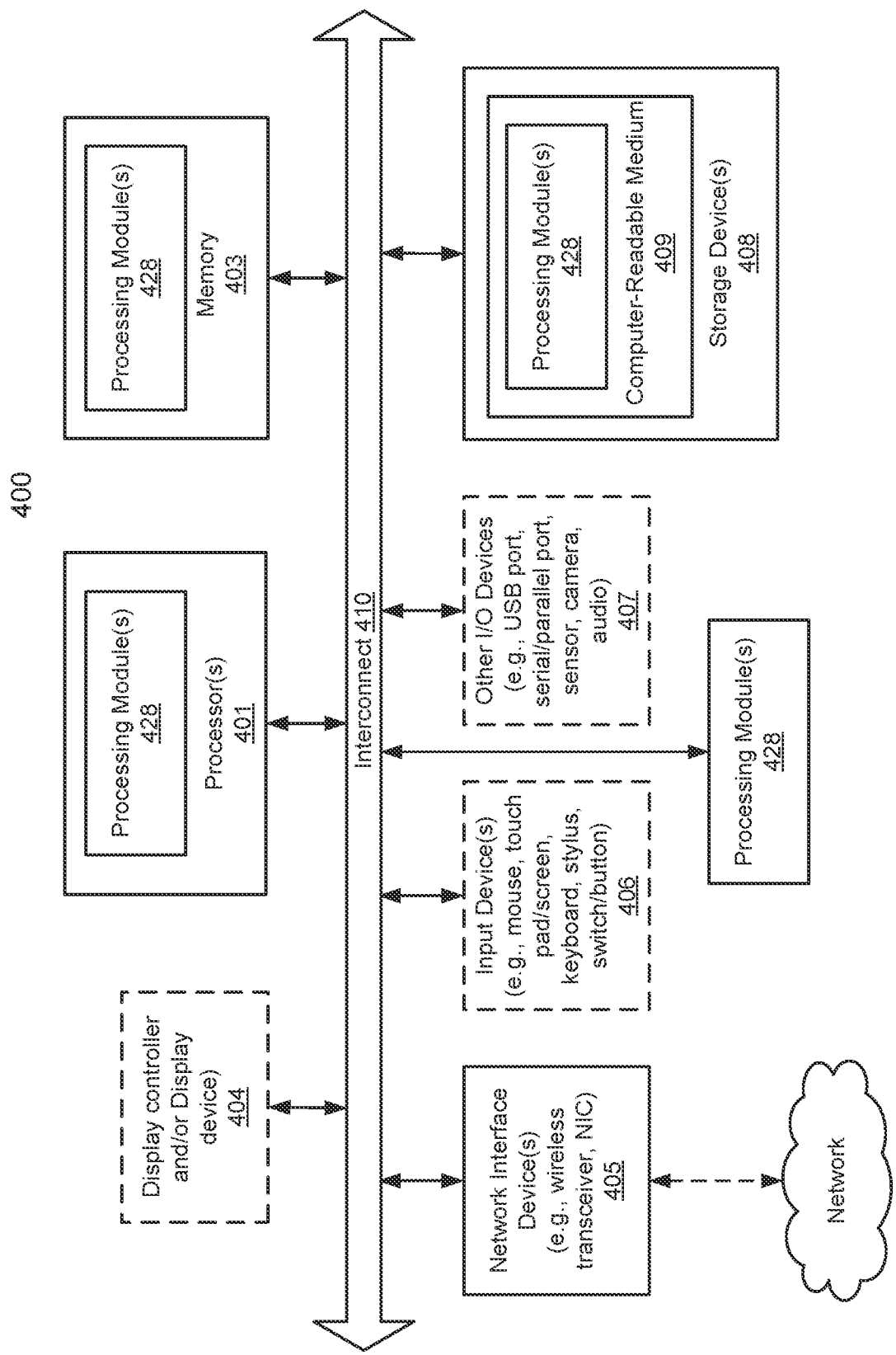
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operations of a data processing system, the method comprising:
    identifying that a secret management component of the data processing system has been replaced; and
    based on the secret management component having been replaced:
        obtaining a recovery secret from a recovery partition of the data processing system, the recovery partition being a logical allocation of storage resources of a physical data storage device that is distinct from the secret management component, and the recovery partition is reserved for exclusive use by an agent of the data processing system that manages recovery of connections with a device management system after failure of the secret management component;
        attempting to establish a recovery connection between the data processing system and the device management system using the recovery secret; and
        in a first instance of the attempting where the recovery connection is established using the recovery secret:
            initiating generation of a new normal secret;
            initiating generation of a new recovery secret;
            storing the new normal secret in a replacement secret management component;
            replacing the recovery secret in the recovery partition with the new recovery secret;
            initiating establishment of a new normal connection using the new normal secret in the replacement secret management component; and
            terminating the recovery connection so that only the new normal connection is available for communication between the data processing system and the device management system.

2. The method of claim 1, wherein the secret management component is a trusted platform module (TPM) hosted by a motherboard of the data processing system.

3. The method of claim 2, wherein the secret management component that was replaced previously stored, before being replaced, a normal secret used to securely communicate with the device management system.

4. The method of claim 1, wherein the recovery secret is partially trusted by the device management system and the device management system requires at least one additional indication of trustworthiness for the recovery secret to be fully trusted by the device management system.

5. The method of claim 1, wherein attempting to establish the recovery connection comprises:
    sending, by an agent, a data package to the device management system comprising an identifier of the replacement secret management component and/or a replaced motherboard of the data processing system;
    refusing, by the device management system and prior to being notified that the secret management component has been replaced, to establish the recovery connection; and
    participating, by the device management system and after being notified that the secret management component has been replaced, in establishment of the recovery connection.

6. The method of claim 5, further comprising:
    while refusing to establish the recovery connection:

obtaining, by the device management system and from a trusted system, a notification indicating that the secret management component has been replaced.

7. The method of claim 6, wherein the trusted system is a data processing system used by a person that was tasked with replacing the secret management component.

8. The method of claim 5, wherein refusing to establish the recovery connection comprises:
comparing, by the device management system, at least one of the identifier of the replacement secret management component and/or the identifier of the replaced motherboard to a known set of trusted identifiers of hardware components;
in a first instance of the comparing where the at least one of the identifier of the replacement secret management component and/or the identifier of the replaced motherboard is not any of the known set of trusted identifiers of hardware components:
concluding that the data processing system is untrustworthy; and
in a second instance of the comparing where the at least one of the identifier of the replacement secret management component and/or the identifier of the replaced motherboard is one of the known set of trusted identifiers of hardware components:
concluding that the data processing system is trustworthy based on being notified that the secret management component has been replaced.

9. The method of claim 1, wherein initiating generation of the new normal secret comprises:
providing, by an agent of the data processing system, a potential normal secret to the device management system;
signing, by the device management system, the potential normal secret to obtain the new normal secret; and
obtaining, by the data processing system and from the device management system, the new normal secret.

10. The method of claim 9, wherein the new normal secret is generated by the data processing system and provided to the device management system for validation.

11. The method of claim 1, wherein once the new normal secret is stored in the secret management component, the secret management component screens access to the new normal secret and facilitates selective use of the new normal secret while a security posture of the data processing system meets security requirements.

12. The method of claim 1, further comprising:
prior to identifying that the secret management component of the data processing system has been replaced:
establishing a normal connection using a normal secret that is managed by the secret management component prior to replacement and that allows a secure communication channel between the data processing system and the device management system to be instantiated, the normal secret being separately stored in the secret management component; and
using the normal connection to establish the recovery secret to store in the recovery partition.

13. The method of claim 12, wherein the data processing system is restricted from communicating with other devices other than the device management system.

14. A non-transitory machine-readable medium having instructions stored therein, which when executed by a processor, cause the processor to perform operations for managing operations of a data processing system, the operations comprising:
identifying that a secret management component of the data processing system has been replaced; and
based on the secret management component having been replaced:
obtaining a recovery secret from a recovery partition of the data processing system, the recovery partition being a logical allocation of storage resources of a physical data storage device that is distinct from the secret management component, and the recovery partition is reserved for exclusive use by an agent of the data processing system that manages recovery of connections with a device management system after failure of the secret management component;
attempting to establish a recovery connection between the data processing system and the device management system using the recovery secret; and
in a first instance of the attempting where the recovery connection is established using the recovery secret:
initiating generation of a new normal secret;
initiating generation of a new recovery secret;
storing the new normal secret in a replacement secret management component;
replacing the recovery secret in the recovery partition with the new recovery secret;
initiating establishment of a new normal connection using the new normal secret in the replacement secret management component; and
terminating the recovery connection so that only the new normal connection is available for communication between the data processing system and the device management system.

15. The non-transitory machine-readable medium of claim 14, wherein the secret management component is a trusted platform module (TPM) hosted by a motherboard of the data processing system.

16. The non-transitory machine-readable medium of claim 15, wherein the secret management component that was replaced previously stored, before being replaced, a normal secret used to securely communicate with the device management system.

17. A data processing system, comprising:
a processor; and
a memory coupled to the processor to store instructions, which when executed by the processor, cause the processor to perform operations for managing operations of the data processing system, the operations comprising:
identifying that a secret management component of the data processing system has been replaced; and
based on the secret management component having been replaced:
obtaining a recovery secret from a recovery partition of the data processing system, the recovery partition being a logical allocation of storage resources of a physical data storage device that is distinct from the secret management component, and the recovery partition is reserved for exclusive use by an agent of the data processing system that manages recovery of connections with a device management system after failure of the secret management component;
attempting to establish a recovery connection between the data processing system and the device management system using the recovery secret; and in a first instance of the attempting where the recovery connection is established using the recovery secret:
  initiating generation of a new normal secret;
  initiating generation of a new recovery secret;
  storing the new normal secret in a replacement secret management component;
  replacing the recovery secret in the recovery partition with the new recovery secret;
  initiating establishment of a new normal connection using the new normal secret in the replacement secret management component; and
  terminating the recovery connection so that only the new normal connection is available for communication between the data processing system and the device management system.

18. The data processing system of claim 17, wherein the secret management component is a trusted platform module (TPM) hosted by a motherboard of the data processing system.

19. The data processing system of claim 18, wherein the secret management component that was replaced previously stored, before being replaced, a normal secret used to securely communicate with the device management system.

20. The data processing system of claim 17, wherein the recovery secret is partially trusted by the device management system and the device management system requires at least one additional indication of trustworthiness for the recovery secret to be fully trusted by the device management system.

* * * * *